United States Patent
Morrison, III et al.

(10) Patent No.: US 10,391,387 B2
(45) Date of Patent: Aug. 27, 2019

(54) PRESENTING DIGITAL CONTENT ITEM WITH TIERED FUNCTIONALITY

(71) Applicant: Microsoft Technology Licensing, LLC, Redmond, WA (US)

(72) Inventors: Frank R. Morrison, III, Seattle, WA (US); Brandon Hunt, Redmond, WA (US); Jeffrey David Henshaw, Redmond, WA (US); Michael Gallop, Sammamish, WA (US); Ivan P. Trindev, Issaquah, WA (US); Eric Neil Lockard, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 551 days.

(21) Appl. No.: 13/715,913

(22) Filed: Dec. 14, 2012

(65) Prior Publication Data

US 2014/0171205 A1 Jun. 19, 2014

(51) Int. Cl.
*A63F 9/24* (2006.01)
*A63F 13/30* (2014.01)

(52) U.S. Cl.
CPC .......... *A63F 13/12* (2013.01); *A63F 2300/40* (2013.01); *A63F 2300/55* (2013.01); *A63F 2300/609* (2013.01); *A63F 2300/632* (2013.01)

(58) Field of Classification Search
CPC ........... G06F 17/30899; G06F 3/04815; G06F 3/0482; G06F 3/04817; H04L 2209/60;
(Continued)

(56) References Cited

U.S. PATENT DOCUMENTS

| 7,555,532 B2 | 6/2009 | Decasper et al. |
| 7,653,689 B1 | 1/2010 | Champagne et al. |

(Continued)

FOREIGN PATENT DOCUMENTS

| CN | 1422408 A | 6/2003 |
| CN | 101184016 A | 5/2004 |

(Continued)

OTHER PUBLICATIONS

Sandlin, Jason, "DirectX Installation for Game Developers", Retrieved at <<http://msdn.microsoft.com/en-us/library/windows/desktop/ee416805(v=vs.85).aspx>>, Retrieved Date Aug. 22, 2012, pp. 3.

(Continued)

*Primary Examiner* — Steve Rowland
(74) *Attorney, Agent, or Firm* — Alleman Hall Creasman & Tuttle LLP

(57) ABSTRACT

Acquiring an interactive digital content item including a plurality of content portions includes receiving a first set of the content portions that is less than an entirety of the content portions. A partial functionality version of the interactive digital content item is presented using the first set of content portions. A second set of the content portions is received while the partial functionality version of the interactive digital content item is presented. Functionality is added to the partial functionality version of the interactive digital content item using the second set of content portions without interrupting presentation of the partial functionality version of the interactive digital content item.

18 Claims, 3 Drawing Sheets

(58) Field of Classification Search
CPC .... H04L 65/4084; H04N 21/00; H04N 1/40068; A63F 2300/552; A63F 2300/407; A63F 13/12
USPC .................................................. 463/31–33
See application file for complete search history.

(56) References Cited

U.S. PATENT DOCUMENTS

| | | | |
|---|---|---|---|
| 7,698,460 B2 | 4/2010 | Zhang et al. | |
| 7,783,777 B1 | 8/2010 | Pabla et al. | |
| 7,788,701 B1 | 8/2010 | Lavin | |
| 7,881,235 B1 | 2/2011 | Arthur et al. | |
| 7,995,473 B2 | 8/2011 | Twiss et al. | |
| 8,043,156 B2 | 10/2011 | Ackley et al. | |
| 8,086,722 B2 | 12/2011 | Bland et al. | |
| 8,099,511 B1 | 1/2012 | Ganesan et al. | |
| 8,180,720 B1 | 5/2012 | Kovacs et al. | |
| 8,613,673 B2 * | 12/2013 | Perry .................... | A63F 13/30 463/42 |
| 9,294,580 B2 | 3/2016 | Morriso et al. | |
| 9,374,420 B2 | 6/2016 | Burba et al. | |
| 9,413,846 B2 | 8/2016 | Burba et al. | |
| 9,596,306 B2 | 3/2017 | Morriso et al. | |
| 9,661,072 B2 | 5/2017 | Burba et al. | |
| 9,716,749 B2 | 7/2017 | Akkurt et al. | |
| 9,781,056 B2 | 10/2017 | Burba et al. | |
| 10,129,334 B2 | 11/2018 | Akkurt et al. | |
| 2002/0057850 A1 | 5/2002 | Sirohey et al. | |
| 2003/0204602 A1 | 10/2003 | Hudson et al. | |
| 2004/0044790 A1 | 3/2004 | Loach et al. | |
| 2004/0148424 A1 | 7/2004 | Berkson et al. | |
| 2004/0236869 A1 | 11/2004 | Moon | |
| 2004/0248637 A1 | 12/2004 | Liebenberg et al. | |
| 2006/0064476 A1 | 3/2006 | Decasper et al. | |
| 2006/0187928 A1 | 8/2006 | Mcgee et al. | |
| 2007/0021196 A1 | 1/2007 | Campbell et al. | |
| 2007/0026945 A1 | 2/2007 | Nguyen | |
| 2007/0061201 A1 | 3/2007 | Ellis et al. | |
| 2007/0136268 A1 * | 6/2007 | Qureshi et al. .................... 707/4 | |
| 2007/0174471 A1 | 7/2007 | Van Rossum | |
| 2007/0208748 A1 | 9/2007 | Li | |
| 2008/0005336 A1 | 1/2008 | Cohen et al. | |
| 2008/0059631 A1 | 3/2008 | Bergstrom et al. | |
| 2008/0098123 A1 | 4/2008 | Huang et al. | |
| 2008/0133767 A1 | 6/2008 | Birrer et al. | |
| 2008/0155061 A1 | 6/2008 | Afergan et al. | |
| 2008/0167127 A1 | 7/2008 | Turkstra et al. | |
| 2008/0243735 A1 | 10/2008 | Rish et al. | |
| 2008/0310302 A1 | 12/2008 | Detwiler et al. | |
| 2009/0005057 A1 | 1/2009 | Lee et al. | |
| 2009/0062007 A1 * | 3/2009 | Chihaya .................... 463/42 | |
| 2009/0077220 A1 | 3/2009 | Svendsen et al. | |
| 2009/0083362 A1 | 3/2009 | Svendsen | |
| 2009/0100128 A1 | 4/2009 | Czechowski et al. | |
| 2009/0122697 A1 | 5/2009 | Madhyasha et al. | |
| 2009/0234967 A1 | 9/2009 | Yu et al. | |
| 2009/0265473 A1 | 10/2009 | Hydrie et al. | |
| 2009/0288127 A1 | 11/2009 | Corson et al. | |
| 2009/0320144 A1 | 12/2009 | Fang et al. | |
| 2010/0011103 A1 | 1/2010 | Luzzatti et al. | |
| 2010/0161752 A1 | 6/2010 | Collet et al. | |
| 2010/0161755 A1 | 6/2010 | Li et al. | |
| 2010/0169498 A1 | 7/2010 | Palanki et al. | |
| 2010/0229108 A1 | 9/2010 | Gerson et al. | |
| 2010/0257403 A1 | 10/2010 | Virk et al. | |
| 2010/0269044 A1 | 10/2010 | Ivanyi et al. | |
| 2010/0274765 A1 | 10/2010 | Murphy et al. | |
| 2010/0293294 A1 | 11/2010 | Hilt et al. | |
| 2010/0306339 A1 | 12/2010 | Ling et al. | |
| 2011/0060798 A1 | 3/2011 | Cho et al. | |
| 2011/0078230 A1 | 3/2011 | Sepulveda | |
| 2011/0119615 A1 * | 5/2011 | Cisler et al. .................... 715/772 | |
| 2011/0131278 A1 | 6/2011 | Nieh et al. | |
| 2011/0153835 A1 | 6/2011 | Rimac et al. | |
| 2011/0179164 A1 | 7/2011 | Memon et al. | |
| 2011/0191419 A1 | 8/2011 | Painter et al. | |
| 2011/0191420 A1 | 8/2011 | Painter et al. | |
| 2011/0246658 A1 | 10/2011 | Dettori et al. | |
| 2011/0258309 A1 | 10/2011 | Chambers et al. | |
| 2011/0302248 A1 | 12/2011 | Garrett et al. | |
| 2011/0304625 A1 * | 12/2011 | Gerhard et al. .................... 345/428 | |
| 2012/0122570 A1 | 5/2012 | Baronoff | |
| 2012/0163180 A1 | 6/2012 | Goel | |
| 2012/0167150 A1 | 6/2012 | Le scouarnec et al. | |
| 2012/0173655 A1 | 7/2012 | Mcentee | |
| 2012/0185595 A1 | 7/2012 | Varvello et al. | |
| 2012/0201158 A1 | 8/2012 | Geirhofer et al. | |
| 2012/0210014 A1 | 8/2012 | El-beltagy | |
| 2012/0221646 A1 | 8/2012 | Ciminiera et al. | |
| 2012/0221647 A1 | 8/2012 | Ciminiera et al. | |
| 2012/0221692 A1 | 8/2012 | Steiner et al. | |
| 2012/0272164 A1 | 10/2012 | Polonsky et al. | |
| 2012/0331146 A1 | 12/2012 | Hsu et al. | |
| 2013/0024510 A1 | 1/2013 | Varvello et al. | |
| 2013/0079132 A1 * | 3/2013 | Archer et al. .................... 463/31 | |
| 2013/0151937 A1 * | 6/2013 | Weber et al. .................... 715/207 | |
| 2013/0208620 A1 | 8/2013 | Kaufman et al. | |
| 2014/0095605 A1 | 4/2014 | Varvello et al. | |
| 2014/0164627 A1 | 6/2014 | Burba et al. | |
| 2014/0172971 A1 | 6/2014 | Akkurt et al. | |
| 2014/0172972 A1 | 6/2014 | Burba et al. | |
| 2014/0173022 A1 | 6/2014 | Morrison et al. | |
| 2014/0173024 A1 | 6/2014 | Burba et al. | |
| 2014/0258415 A1 | 9/2014 | L'heureux et al. | |
| 2016/0134704 A1 | 5/2016 | Morrison et al. | |
| 2016/0285784 A1 | 9/2016 | Burba et al. | |
| 2016/0344805 A1 | 11/2016 | Burba et al. | |
| 2017/0230450 A1 | 8/2017 | Burba et al. | |
| 2017/0279882 A1 | 9/2017 | Akkurt et al. | |

FOREIGN PATENT DOCUMENTS

| | | |
|---|---|---|
| CN | 1852252 A | 10/2006 |
| CN | 101123565 A | 2/2008 |
| CN | 101127619 A | 2/2008 |
| CN | 101267379 A | 9/2008 |
| CN | 101272404 A | 9/2008 |
| CN | 101304382 A | 11/2008 |
| CN | 101345628 A | 1/2009 |
| CN | 101385280 A | 3/2009 |
| CN | 101562804 A | 10/2009 |
| CN | 101621538 A | 1/2010 |
| CN | 101681331 A | 3/2010 |
| CN | 101730888 A | 6/2010 |
| CN | 101841556 A | 9/2010 |
| CN | 102006234 A | 4/2011 |
| EP | 1783635 A1 | 5/2007 |
| EP | 1821487 A1 | 8/2007 |
| GB | 2476487 A | 6/2011 |
| JP | 2004533684 A | 11/2004 |
| JP | 2007513401 A | 5/2007 |
| JP | 2009093417 A | 4/2009 |
| JP | 2010027053 A | 2/2010 |
| JP | 2010519658 A | 6/2010 |
| JP | 2012216973 A | 11/2012 |
| RU | 2440681 C2 | 1/2012 |
| WO | 0200317 A1 | 1/2002 |
| WO | 2004100010 A1 | 11/2004 |
| WO | 2010141876 A1 | 12/2010 |

OTHER PUBLICATIONS

Lin, Jack., "Install-on-Demand for Games", Retrieved at <<http://msdn.microsoft.com/en-us/library/windows/desktop/ee418268(v=vs.85).aspx>>, Dec. 2004, pp. 5.

Doull, Andrew., "Opinion: on Progression in Games", Retrieved at <<http://www.gamasutra.com/php-bin/news_index.php?story=20644>>, Oct. 16, 2008, pp. 5.

Bartolomeo, Dave., "Installation and Maintenance of Games", Retrieved at <<http://msdn.microsoft.com/en-us/library/windows/desktop/ee418265(v=vs.85).aspx>>, Jul. 2003, pp. 4.

(56) References Cited

OTHER PUBLICATIONS

"Legacy Game Installation Troubleshooting", Retrieved at <<http://us.battle.net/support/en/article/installation-troubleshooting>>, Retrieved Date Aug. 22, 2012, pp. 2.
ISA European Patent Office, International Search Report & Written Opinion for Patent Application No. PCT/US2013/074151, dated Mar. 4, 2014, 9 pages.
"'Super-fast' Game Download Launch", BBC News, http://newsvote.bbc.co.uk/mpapps/pagetools/print/news.bbc.co.uk/2/hi/technology/7946697.stm?ad=1, Mar. 17, 2009, 2 pages.
"Awomo", Wikipedia, http://en.wikipedia.org/w/index.php?title=Awomo&oldid=505652604, Aug. 3, 2012, 3 pages.
European Patent Office, Office Action Issued in European Patent Application No. 13814337.5, dated Oct. 27, 2015, Germany, 3 Pages.
The State Intellectual Property Office of China, Office Action issued in Chinese Patent Application No. 201380065220.6, dated Dec. 29, 2016, China, 7 pages. (Submitted with English Summary of Objections Raised in Office Action as English explanation of relevance).
"Cisco Content Delivery Applications for Internet Streaming (Version 2.5)", Retrieved from http://www.softtel.ro/files/CDS/CDS.pdf, Retrieved Date: Aug. 23. 2012, 10 Pages.
"Peer to Peer Content Delivery Network", Retrieved from http://web.archive.org/web/20120329201649/http://www.konnect2gim.com/2011/05/peer-to-peer-content-delivery-network.html, May 8, 2011, 5 Pages.
"Final Office Action Issued in U.S. Appl. No. 13/715,668", dated May 6, 2016, 13 Pages.
"Non-Final Office Action Issued in U.S. Appl. No. 13/715,668", dated Aug. 29, 2016, 14 Pages.
"Non-Final Office Action Issued in U.S. Appl. No. 13/715,668", dated Oct. 8, 2015, 13 Pages.
"Final Office Action Issued in U.S. Appl. No. 13/715,834", dated Dec. 10, 2015, 9 Pages.
"Final Office Action Issued in U.S. Appl. No. 13/715,834", dated Mar. 30, 2015, 11 Pages.
Xu, et al. "Analysis of a Cnd—P2P Hybrid Architecture for Cost-Effective Streaming Media Distribution", In Multimedia Systems, Springer, vol. 11, Issue 04, Apr. 1, 2006, 17 Pages.
"Non-final Office Action Issued in U.S. Appl. No. 13/715,834", dated Aug. 3, 2015, 10 Pages.
"Office Action Issued in European Patent Application No. 13814337.5", dated Sep. 21, 2018, 5 Pages.
"Non Final Office Action Issued in U.S. Appl. No. 14/997,792", dated Apr. 22, 2016, 7 Pages.
"Non Final Office Action Issued in U.S. Appl. No. 15/179,721", dated Nov. 3, 2016, 15 Pages.
"Final Office Action Issued in U.S. Appl. No. 15/499,517", dated Jul. 18, 2018, 9 Pages.
"Non Final Office Action Issued in U.S. Appl. No. 15/499,517", dated Mar. 5, 2018, 12 Pages.
"Non-Final Office Action Issued in U.S. Appl. No. 15/618,021", dated Oct. 10, 2017, 10 Pages.
"Search Report Issued in European Patent No. 16158566.6", dated Jul. 5, 2016, 4 Pages.
"Office Action Issued in Australian Patent Application No. 2013359194", dated Oct. 24, 2016, 2 Pages.
"Office Action Issued in Chinese Application No. 201380065170.1", dated May 22, 2017, 8 Pages.
"Second Office Action Issued in Chinese Patent Application No. 201380065170.1", dated Nov. 7, 2017, 7 Pages.
"Third Office Action Issued in Chinese Patent Application No. 201380065170.1", dated Apr. 24, 2018, 6 Pages.
"First Office Action and Search Report Issued in Chinese Patent Application No. 201380065212.1", dated May 24, 2017, 14 Pages.
"Second Office Action Issued in Chinese Patent Application No. 201380065212.1", dated Nov. 6, 2017, 6 Pages.
"First Office Action and Search Report Issued in Chinese Patent Application No. 201380065282.7", dated Jun. 19, 2017, 14 Pages.
"Second Office Action Issued in Chinese Patent Application No. 201380065282.7", dated Dec. 19, 2017, 16 Pages.
"Office Action and Search Report Issued in Russian Patent Application No. 2015122687", dated Dec. 4, 2017, 10 Pages.
"Office Action Issued in Japanese Patent Application No. 2015-547498", dated Dec. 5, 2017, 8 Pages.
"Office Action Issued in Japanese Patent Application No. 2015-547498", dated Apr. 17, 2018, 5 Pages.
"Office Action Issued in Japanese Patent Application No. 2015-547572", dated Dec. 1, 2017, 4 Pages.
Barbieri, Stefano, "CoopViz: Real Time Visualization of BitTorrent Swarm Dynamics", Published in Master's Thesis in Computer Engineering, Faculty of Electrical Engineering, Mathematics and Computer Science, Delft University of Technology, Sep. 15, 2009, 61 Pages.
Buyya, et al., "A Case for Peering of Content Delivery Networks", In Proceedings of the IEEE Distributed Systems Online, vol. 7, Issue 10, Oct. 2006, 14 Pages.
Hoogendoorn, Henk, "ConfigMgr 2012 Beta 2 with App-V integration", Retrieved from http://henkhoogendoom.blogspot.in/2011/06/configmgr-2012-beta-2-with-app-v.html, Jun. 7, 2011, 5 Pages.
Hu, et al., "Simple peer selection strategies for fast and fair peer-to-peer file sharing", In Proceedings of the 12th International Conference on Advanced Communication Technology (ICACT), Feb. 7, 2010, pp. 208-213.
Jernberg, et al., "DOH: A Content Delivery Peer-to-Peer Network", In Proceedings of the 12th International Conference on Parallel Processing, Aug. 28, 2006, 13 Pages.
Madhyastha, et al., "iPlane Nano: Path Prediction for Peer-to-Peer Applications", In Proceedings of the 6th USENIX Symposium on Networked Systems Design and Implementation, Apr. 22, 2009, 16 Pages.
Markanda, et al., "Hybrid CDNs Leveraging the Best of Both Worlds", Published in Tech Mahindra White Paper, 2010, 7 Pages.
Meskovic, et al., "Content Delivery Architectures for Live Video Streaming: Hybrid CDN-P2P as the Best Option", In Proceedings of the Fifth International Conference on Communication Theory, Reliability, and Quality of Service, Apr. 29, 2012, 7 Pages.
Michiardi, et al., "Peer-Assisted Content Distribution on a Budget", In Journal of Computer and Telecommunications Networking, vol. 56, Issue 7, May 3, 2012, 11 Pages.
"Office Action Issued in Mexico Patent Application No. MX/a/2015/007561", dated Feb. 27, 2017, 2 Pages. (w/o English Translation).
Pakkala, et al., "Towards a Peer-to-Peer Extended Content Delivery Network", in Proceedings of 14th IST Mobile and Wireless Communications Summit, Jun. 19, 2005, 5 Pages.
"International Preliminary Report on Patentability Issued in PCT Patent Application No. PCT/US2013/074169", dated Nov. 18, 2014, 6 Pages.
"International Search Report and Written Opinion Issued in PCT Application No. PCT/US2013/074169", dated Apr. 7, 2014, 8 Pages.
"International Search Report and Written Opinion Issued in PCT Application No. PCT/US2013/074404", dated Mar. 24, 2014, 9 Pages.
"International Search Report and Written Opinion Issued in PCT Application No. PCT/US2013/074412", dated Mar. 5, 2014, 8 Pages.
"International Preliminary Report on Patentability Issued in PCT Patent Application No. PCT/US2013/074806", dated Nov. 13, 2014, 6 Pages.
"International Search Report and Written Opinion Issued in PCT Application No. PCT/US2013/074806", dated Apr. 1, 2014, 8 Pages.
Peterson, et al., "Antfarm: Efficient Content Distribution with Managed Swarms", in Proceedings of the 6th USENIX Symposium on Networked Systems Design and Implementation, Apr. 22, 2009, 16 Pages.
Pushp, et al., "Hybrid Content Distribution Network with a P2P Based Streaming Protocol", in Proceedings of International Conference on Broadband Communications, Networks and Systems, Retrieved Date: Aug. 14, 2012, 9 Pages.

(56) References Cited

OTHER PUBLICATIONS

Shakshuki, et al., "P2P Multi-Agent Data Transfer and Aggregation in Wireless Sensor Networks", in Proceedings of the IEEE International Conference on Mobile Adhoc and Sensor Systems (MASS), Oct. 2006, pp. 645-649.
Slot, et al., "Zero-Day Reconciliation of BitTorrent Users with Their ISPs", in Proceedings of the 15th International Euro-Par Conference on Parallel Processing, Aug. 25, 2009, 13 Pages.
Kinggfeng, et al., "Requirements for P2P—Based IPTV Media Delivery System", in Proceedings of 1st FGQ IPTV Meeting, Jul. 10, 2006, 4 Pages.
State Intellectual Property Office of the People's Republic of China, Second Office Action and Search Report Issued in Chinese Patent Application No. 201380065220.6, dated Jun. 2, 2017, 13 Pages.
"Office Action Issued in European Patent Application No. 13814740.0", dated Nov. 16, 2018, 5 Pages.

\* cited by examiner

PRESENTING DIGITAL CONTENT ITEM WITH TIERED FUNCTIONALITY

BACKGROUND

Typical interactive digital content items, such as video games, comprise a plurality of content portions defining a game engine, models, textures, sound, levels, and the like. Although a small subset of the content portions are typically needed to begin interacting with such content items, interaction with digital content items is typically prohibited until the entire content item is installed onto local storage.

SUMMARY

Embodiments are disclosed for acquiring an interactive digital content item including a plurality of content portions. One example embodiment provides a method comprising receiving a first set of the content portions, the first set including less than an entirety of the content portions, and presenting a partial functionality version of the interactive digital content item using the first set of content portions. The method further comprises receiving a second set of the content portions while the partial functionality version of the interactive digital content item is presented, and adding functionality to the partial functionality version of the interactive digital content item using the second set of content portions without interrupting presentation of the partial functionality version of the interactive digital content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Typical interactive digital content items, such as video games, comprise a plurality of content portions defining game engines, models, textures, sound, levels, and the like. In typical use case scenarios, it may be expected that the entirety of a digital content item is installed on, or otherwise transferred to, a local storage machine before interaction with the digital content item is allowed. However, the amount of data needed to commence interaction with a particular content item (e.g., game engine, user-controlled character and a few weapons of a combat video game) is provided by a relatively small amount of the overall content item data. Accordingly, it will be appreciated that it may be desirable to preferentially acquire content portions usable to commence interaction with a digital content item such that a user is able to begin interacting with the digital content item as quickly as possible. For example, in a level-based video game, it may be desirable to acquire content portion(s) corresponding to a first level before acquiring additional content portions.

It will be further appreciated that interaction with a particular interactive digital content item may potentially be provided even faster by initially providing a partial functionality version of the digital content item and progressively adding additional functionality as additional content portion(s) are received. For example, continuing with the level-based video game example, a "white room" environment including a user-controlled character may be provided near-instantaneously, while additional functionality (e.g., scenery, sounds, enemy characters, weapons, etc.) are progressively added until a full functionality version of the digital content item is presentable. In this way, by providing a "tiered" user experience, a user of such a digital content item may be able to interact with the digital content item during installation, thereby immersing the user in the digital content item quicker and potentially increasing a likelihood that the user will continue to interact with the digital content item in the future.

Accordingly, embodiments are disclosed herein that relate to acquiring a digital content item by presenting a partial functionality version of the digital content item and progressively adding functionality until sufficient content portions have been received for providing a full functionality version of the digital content item.

Figure 1:
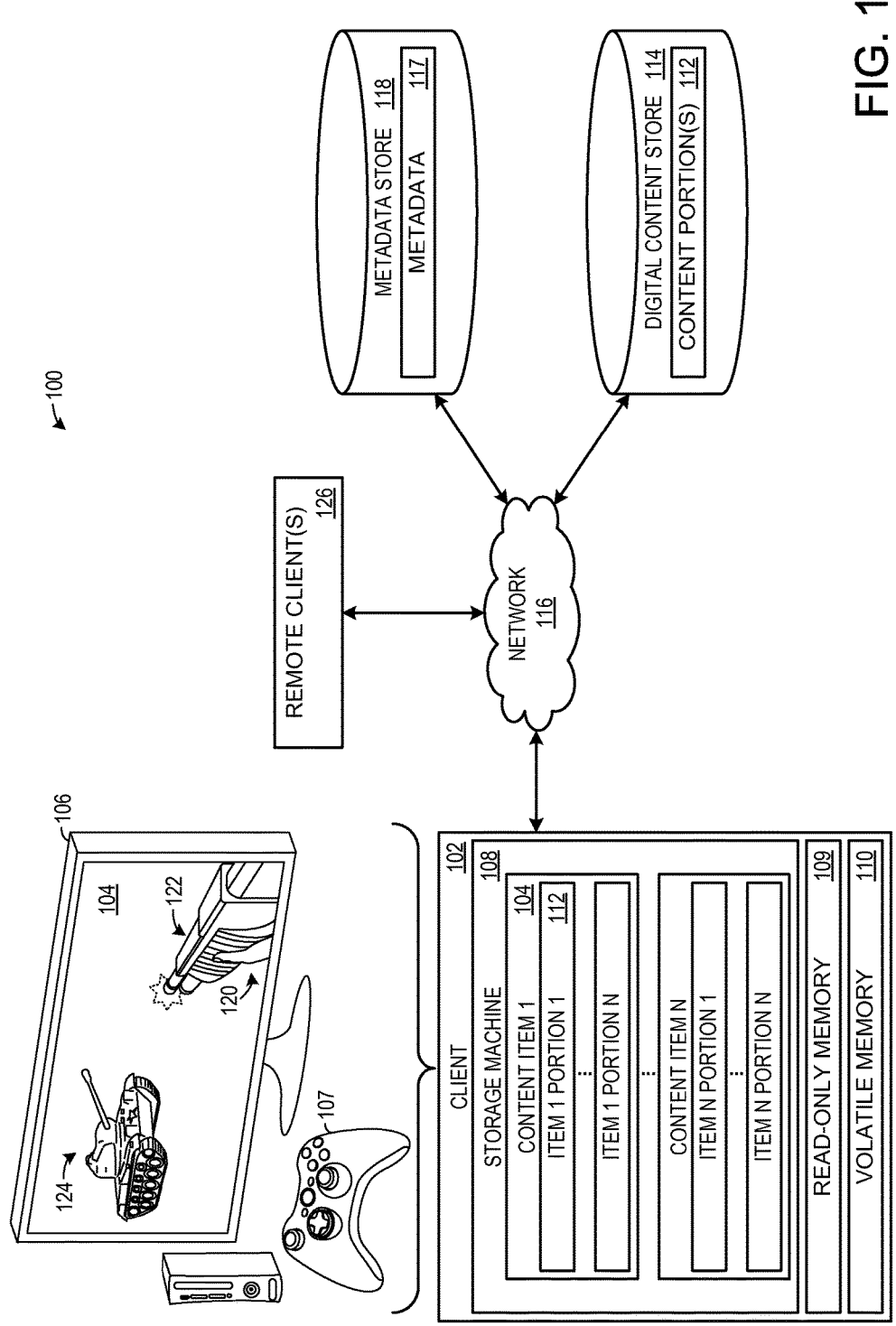
FIG. 1 shows an example use environment for acquiring a digital content item.

An example embodiment of a use environment 100 is described with reference to FIG. 1. Environment 100 includes client 102 (e.g., gaming device, media device, etc.) configured to present digital content item 104. For example, digital content item 104 may be displayed via display device 106 and controlled via input device 107 in some embodiments. Although illustrated as discrete devices, display device 106 and input device 107 may be at least partially incorporated in other embodiments (e.g., handheld device scenarios). It will be appreciated that the configuration of client 102 is presented for the purpose of example, and is not intended to be limiting in any manner.

Client 102 further comprises non-volatile storage machine 108 (e.g., hard drive, solid state memory, etc.) and volatile memory 110 (e.g., Random Access Memory "RAM"). In some embodiments, client 102 may optionally include read-only memory 109 (e.g., optical disc). Storage machine 108 may be configured for long-term storage of one or more digital content items 104, illustrated as an arbitrary number N of digital content items 104. Each digital content item comprises a plurality of content portions 112, illustrated as an arbitrary number N of content portions 112 for each content item 104. Although each digital content item is illustrated as comprising N number of content portions, it will be understood that each digital content item 104 may comprise any one or more content portions 112.

Generally speaking, client 102 may be configured to present digital content item 104 by dynamically acquiring content portion(s) 112, loading the content portions onto storage machine 108 and potentially buffering the content portions via volatile memory 110. Storage machine 108 may provide relatively fast access to content portion(s) 112 of digital content items 104, and it may therefore be desirable to ensure that the content are stored on the storage machine. In other words, it may be desirable to "install" content items onto the storage machine in order to provide potentially faster access of the content items.

Although the discussion herein is directed to a combat-style video game, it will be understood that each digital content item 104 may represent any suitable type of digital content, including but not limited to interactive content such as video games, interactive video, and social media. Other examples include, but are not limited to, movies, television shows and other videos, music, photo libraries, etc. Likewise, content portions 112 may take any suitable form. For example, content portions 112 may take the form of specific portions of memory (e.g. memory locations, disk sectors, etc.), or, by extension, specific data, files, etc.

In some scenarios, content portions 112 of digital content item 104 may be acquired from read-only memory 109 (e.g., optical disc) and loaded onto the storage machine. In other scenarios, client 102 may be in communication with one or more digital content stores 114 (e.g. locations from which content portion(s) 112 may be acquired) via network 116 (e.g. computer network, cellular phone network, and/or any other suitable type of network) configured to store one or more content portions 112 for one or one or more digital content items 104. While described in the context of a client-server environment, it will be understood that other embodiments may utilize any other suitable architecture, including, but not limited to, a peer-to-peer configuration. It will be appreciated that the configuration of environment 100 is provided for the purpose of example, and is not intended to be limiting in any manner.

Regardless of the location from which the content portion(s) 112 are acquired, the content portion(s) are loaded onto storage machine 108 in order to effect presentation of the corresponding digital content item 104. As mentioned above, in typical scenarios, an entirety of the content portions are loaded onto the storage machine before interaction with the content item is enabled. However, as content items increase in size, such loading may utilize an unsuitable amount of time, thereby increasing the barrier of entry and potentially preventing use of the digital content item.

Accordingly, client 102 may be configured to load a set of content portion(s) usable to provide partial (e.g., "bare-bones") functionality version of digital content item 104 prior to loading additional content portion(s) 112. As one non-limiting example, content portion(s) 112 describing user-controlled character 120 and user-controlled weapon 122 may be loaded before content portion(s) describing additional functionality (e.g., enemy vehicle 124, scenery, ambient sounds, 3D effects, etc.) are acquired. It will be appreciated that the term "character" is used herein to refer to any user-controlled entity (e.g., vehicle, humanoid, etc.), and is not intended to be limiting in any manner. An example use scenario for providing a tiered experience by progressively adding functionality will be described in detail below with reference to FIGS. 2A-2C.

Generally speaking, initially providing a partial functionality version of the digital content item and gradually providing a fuller functionality version may allow users to begin interacting with the content item almost immediately, albeit in a potentially limited manner. For example, in a world-based video game, the partial functionality version of the video game may include a virtual world of limited size and/or functionality (e.g., lacking scenery, etc.), a user-controlled character, and/or a few user-controlled items (e.g., weapons, vehicles, etc.). As another example, a partial functionality version of a combat video game may include a white room with a dummy target, thereby providing an opportunity for a user to become acquainted with various weapons provided by the video game. Such scenarios may thus enable the users to begin experimenting with interactive content item, thereby providing an introduction to the content item, while additional content portions 112 are being acquired.

As additional content portions are progressively acquired, additional functionalities described by the additional content portions are progressively added to the partial version of the content item. For example, continuing with the example video game, vehicles, weapons, etc. not described by the initial set of content portions may appear within the virtual environment as corresponding content portion(s) are acquired. Similarly, the virtual environment itself may receive additional functionality (e.g., increased size, added scenery, etc.) as corresponding content portions are received. In some embodiments, the additional functionality may include an increase in number and/or quality of textures, models, etc. usable to present a particular visual element. In other words, the visual element may be initially provided with a partial set of textures, a model of decreased complexity, etc., and the visual "quality" of such elements may be subsequently increased (e.g., improved texture fidelity, smoothed model, etc.) as additional content portions are received.

Although primarily described with reference to visual elements of a virtual environment, it will be appreciated that the term "functionality" is not limited to such. For example, in some embodiments, a partial functionality version of one or more sounds (e.g., lower-resolution ambient music, sound effects, etc.) and/or other virtual elements may be initially provided, and the resolution, bit rate, etc. may be progressively increased as additional content portions are received. Such scenarios are presented for the purpose of example, and are not intended to be limiting in any manner.

In some embodiments, the partial functionality version of a virtual game element may include a "placeholder" (e.g., text, 2D models, outlines, etc.) alerting the user to a size, description, position, etc. of a full functionality version of the virtual game element. In the example combat video game, locations where additional weapons will be available may be indicated with an outline until the describing content portion(s) are fully acquired, for example. It will be appreciated that these scenarios are presented for the purpose of example and are not intended to be limiting in any manner.

It will be further appreciated that in order to present a partial functionality version of a digital content item and to progressively add functionality thereto, it may be desirable to understand what virtual element(s) are represented by any one or more particular content portions 112. For example, a provider (e.g., publisher, developer, etc.) of each digital content item 104 may specify an order in which content portion(s) 112 are to be installed in some embodiments. In other embodiments, functionality may be added based on a comparison with predefined byte range information. In other words, one or more mapping mechanisms may be configured to determine what one or more virtual elements correspond to a given byte range of the content portions. As mentioned above, each content portion 112 may take the form of specific portions of memory, specific data, files, etc., and it will therefore be appreciated that mapping between content portions 112 and virtual element(s) described thereby may be provided via mechanisms instead of, or in addition to, byte range comparisons without departing from the scope of the present disclosure.

In some embodiments, one or more digital content items 104 and/or portions 112 thereof may have associated descriptive metadata 117 that describes an identity, characteristic, and/or other property of the content portion(s). For example, in the case of a video game, such metadata may comprise information regarding an identity of one or more virtual objects (e.g. character/object identification, location/setting, etc.) represented, either partially or fully, by a particular content portion. The metadata also may comprise information regarding the digital content item as a whole (e.g. genre), and/or any other suitable information. As illustrated in FIG. 1, metadata 117 may be stored, for example, via network-accessible metadata store 118 and/or via read-only memory 109. However, it will be understood that metadata 117 may be stored in any suitable location, including with the corresponding content item and/or content portion(s), without departing from the scope of the present disclosure.

Although the description hereto has been provided with reference to a "single player" digital content item 104, it will be appreciated that functionality may be progressively added to a multiplayer interactive digital content item in some scenarios. As such, environment 100 further includes one or more remote clients 126 in communication with client 102 via network 116. In other embodiments, one or more clients 126 may be in communication with client 102 and/or other clients 126 via mechanism(s) other than network 116, including, but not limited to, peer-to-peer connections.

In multiplayer scenarios, a partial functionality version of the interactive digital content item may include a multiplayer environment comprising a subset of available user-controllable items, and additional functionality may be added in a similar manner to that described above with reference to single player content (e.g., via a "white room"). Additionally, any two or more devices of client 102 and remote clients 126 may be able to interact via corresponding partial functionality versions of the multiplayer game. In other words, multiplayer interaction may be provided between any two devices each presenting a partial functionality version of a multiplayer interactive digital content item.

It will be appreciated that although discussion hereto has been provided with reference to transitioning from a partial functionality of a particular user experience/environment to a full functionality version of the same user experience/environment, it will be appreciated that other configurations are possible without departing from the scope of the present disclosure.

For example, in some embodiments, a partial functionality version of a particular content item may include a pre-defined, "load-specific" user environment (e.g., environment configured for presentation during loading) that is presented for user interaction during loading of the additional content portions. Such a load-specific user environment may be initially presented at "full functionality," and the additional content portions may thus be acquired to progressively add functionality to other user environments not presently being accessed. As the additional environments and/or functionalities thereof are loaded, the user may be alerted of such progression (e.g., via overlay, menu system, alert sound, etc.), and the user may therefore be able to transition to the other environments either programmatically and/or according to user input(s). As one non-limiting example, in multiplayer digital content items, the load-specific user environment may include a multiplayer environment of reduced, in comparison to other "full functionality" environment(s) of the content item, size, visual and/or audio "quality," etc. The load-specific environment may be accessible via additional users and/or computing devices so that multiplayer interaction may be provided during loading of the additional content portions, thereby potentially decreasing the barrier to entry. Generally speaking, it will be appreciated that a partial functionality version may be provided for any suitable digital content item, and any additional functionality may be progressively added thereto, without departing from the scope of the present disclosure.

Figure 2A:
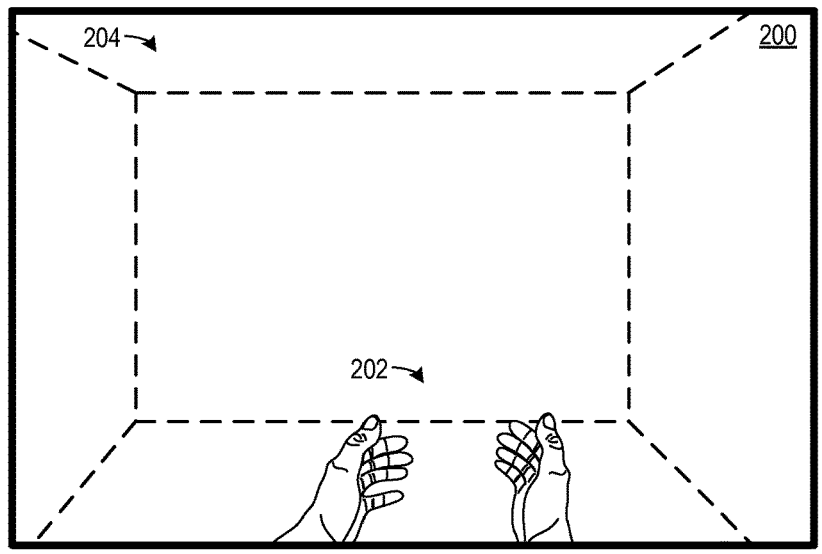
FIGS. 2A-2C show an example use scenario for acquiring and presenting a digital content item with tiered functionality.
Figure 2B:
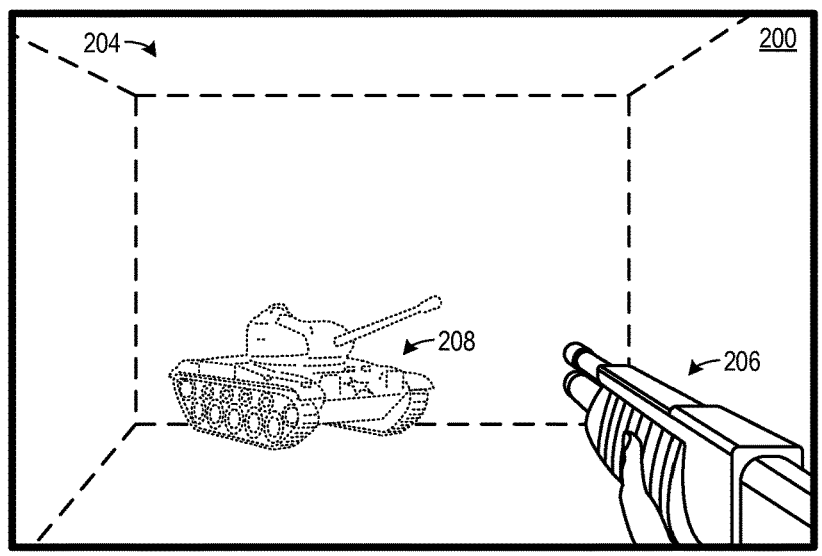
Figure 2C:
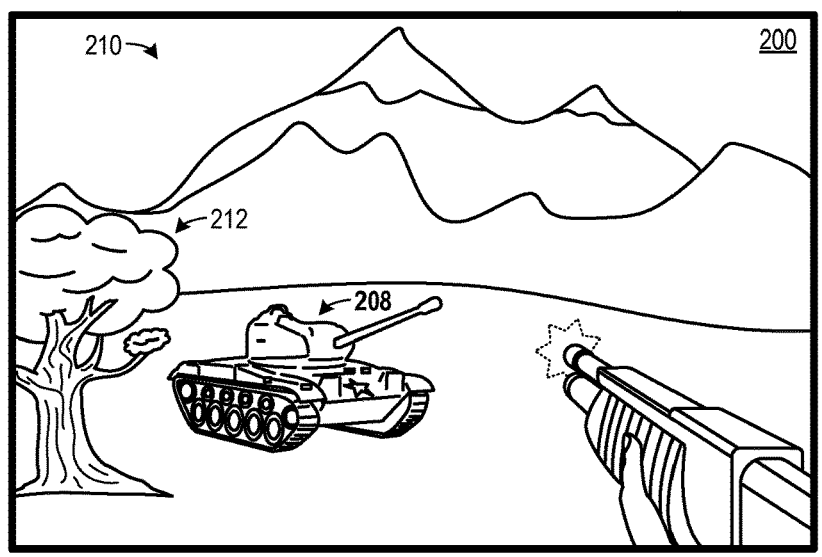

Turning now to FIGS. 2A-2C, an example use scenario for presenting an interactive digital content item 200 with tiered functionality in the form of a combat video game is shown. Specifically, FIG. 2A illustrates a partial functionality version of the digital content item including user-controlled character 202 located within virtual white room environment 204. As used herein, the terms "white room environment," "white room" and the like refer to any rendered virtual environment absent a substantial portion of additional virtual game elements (e.g., sounds, textures, etc.), and does not necessarily denote a color or other configuration (e.g., rectangular prism shape) of such an environment. For example, in other embodiments, the white room environment may include a substantially unbounded virtual environment comprising at least some of the additional game elements. It will be further understood that although the illustrated example of FIGS. 2A-2C comprises a first-person viewpoint, such a configuration is not intended to be limiting in any manner.

The depicted white room environment may enable the user to, for example, become acquainted with the physics, button configuration, speed, etc. of the video game. Such an environment may further enable, for example, adjustment of a user perspective and/or other user-specific customizations. It will be appreciated that such interaction is provided while additional functionality is being received and added, thereby providing interaction with the digital content item even prior to the content item being fully installed.

Turning now to FIG. 2B, the partial functionality version of digital content item 200 of FIG. 2A is illustrated as further comprising additional functionality added upon receipt of additional content portions. Specifically, the added functionality comprises virtual game elements 206 and 208, illustrated as a user-controlled weapon and an enemy vehicle, respectively. Generally speaking, the additional functionality may include, but is not limited to, levels, environments, maps, characters, items, and/or any other virtual element (e.g., menus, etc.).

As with the overall digital content item itself, it will be appreciated that the virtual game elements may be initially provided with partial functionality until sufficient content portion(s) are received to provide a full functionality version. In the case of element 206, a user may be able to switch between partial functionality versions of the weapons, but may not be able to fire the weapons until full functionality versions are provided. In other scenarios, as illustrated by the dashed outline of element 208, a partial functionality version of an in-game element may not be interactable, and may instead indicate a future position, shape, description, etc. of the corresponding virtual element(s). For example, in the case of 3D virtual elements, a partial functionality version of such an element may include a 2D version of the virtual element. Thus, upon receipt of additional content portion(s), the 2D version may progressively "hydrate" into the full-functionality, 3D version. It will be appreciated that these scenarios are presented for the purpose of example, and that a partial functionality version of a particular virtual game element may be provided, and transitioned from, according to various mechanisms without departing from the scope of the present disclosure. For example, as mentioned above, a partial functionality version of textures, models, sound effects, music, etc. may be initially provided, and increased functionality (e.g., improved "quality") may be subsequently provided as additional content portions are received. It will be understood that the additional functionality may be added without substantially interrupting presentation of the digital content item (e.g., without loading screens, etc.).

As additional content portions are received, additional functionality is progressively added to the digital content item until sufficient content portion(s) (e.g., an entirety of the content portions) have been received to provide a full functionality version the digital content item, as illustrated by FIG. 2C. For example, the white room environment is replaced with in-game environment 210 comprising element 212 (e.g., tree or other in-game element) and the user-controlled weapon becomes fully operational. Further, the full functionality version of the digital content item includes a full-functionality (e.g., 3D and interactive) version of enemy vehicle 208. At this point, interaction with digital content item 200 may continue ad infinitum, via one or more discrete game play sessions, until the digital content item is uninstalled.

Figure 3:
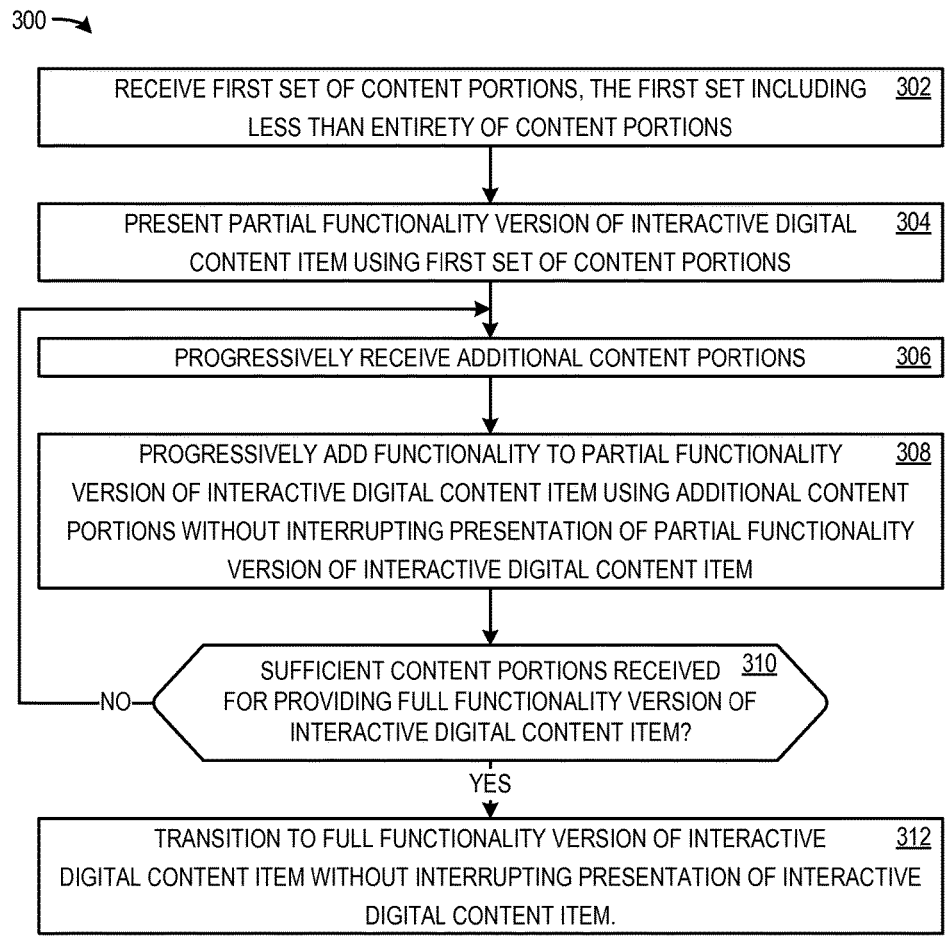
FIG. 3 shows a process flow depicting an example of a method for acquiring a digital content item according to an embodiment of the present disclosure.

Turning now to FIG. 3, an example of a method 300 for acquiring a digital content item comprising a plurality of content portions according to an embodiment of the present disclosure is shown. At 302, method 300 comprises receiving a first set of the content portions, where the first set includes less than an entirety of the content portions. In some embodiments, the content portions may be received according to one or more user inputs (e.g., via interaction with one or more graphical user interfaces), whereas the content portions may be programmatically acquired in other embodiments (e.g. automatic download upon game release, according to one or more recommendation mechanisms, etc.).

At 304, method 300 further comprises presenting a partial functionality version of the interactive digital content item using the first set of content portions. As mentioned above, the first set of content portions may include a predefined set of content portions defined by the developer, publisher, etc. In other embodiments, content portion(s) may be received and one or more mapping mechanisms may be usable to recognize the virtual game elements described by the content portions (e.g., via comparison with predefined byte range information). In other words, byte range information for each received content portion may be compared to predefined byte range information, and the partial functionality version of the interactive digital content item may be presented upon determining that the byte range(s) usable to provide the partial functionality version of the interactive digital content item have been received. In some embodiments, metadata (e.g., metadata 117) describing the content portion(s) may be used in recognizing what element(s) are described by the content portions, as mentioned above. Generally speaking, the partial functionality version of the video game may comprise a minimum amount of information usable to provide user-interaction (e.g., white room and a user-controlled character), though it will be appreciated that the partial functionality version of a digital content item may have any suitable configuration without departing from the scope of the present disclosure.

For example, as mentioned above, the partial functionality version of the digital content item may include a load-specific, full-functionality environment of the digital content item (e.g., multiplayer environment of relatively reduced size) configured to be presented during acquisition of the additional content portions. In other words, such a load-specific environment is initially presented with full functionality, and the additional content portions are acquired to progressively add functionality to the rest of the digital content item (e.g., functionality usable in environment(s) other than the load-specific environment). In contrast to other embodiments where a single environment is progressively filled-in with virtual elements (e.g., sounds, visuals, etc.) of increased quality and/or functionality, such a configuration may potentially decrease the barrier of entry for experiencing the digital content item without initially providing a user experience having, for example, reduced audio and/or image quality. Such a configuration may be desirable, for example, as lower quality visual and/or audio elements may impact the user experience of the digital content item, thereby potentially negatively impacting adoption of the digital content item.

Method 300 further comprises progressively receiving 306 additional content portions and progressively adding 308 functionality to the partial functionality version of the interactive digital content item using the additional content portions without interrupting presentation of the partial functionality version of the interactive digital content item. In other words, as described above, additional content portions are received (e.g., during interaction with the partial functionality version of the video game), and additional functionality provided by the additional content portions is thus progressively added. As described above, at least some of the additional functionality may include virtual game elements (e.g., scenery, enemy characters, etc.) for which a partial functionality version may be initially presented. That is, similar to the content items themselves, the constituent virtual elements may be progressively "filled-out" until sufficient content portion(s) have been received to subsequently provide full functionality versions of the virtual elements.

At 310, method 300 further comprises determining whether sufficient content portions have been received for providing a full functionality version of the digital content item. Such a determination may be effected, for example, according to provided metadata, predefined byte range information and/or other suitable mechanisms or combination of mechanisms without departing from the scope of the present disclosure. If sufficient content portions have not been received, method 300 returns to 306 where additional content portions may be received and additional functionality may be progressively added therefrom. However, if sufficient content portions have been received, method 300 continues to 312 where method 300 further comprises transitioning to the full functionality version of the interactive digital content item without interrupting presentation of the interactive digital content item. In this way, the partial functionality version of an interactive digital content item may be filled-out with additional functionality until all of the functionality of the full functionality version has been added. During such transitions, the functionality is added such that presentation of the digital content item is not interrupted.

Such a configuration may therefore enable interaction with the digital content item to begin as quickly as possible, and for the experience to be continuously expanded without interruption to the experience, thereby decreasing the barrier to entry while gradually providing a fuller functionality version of the digital content item.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
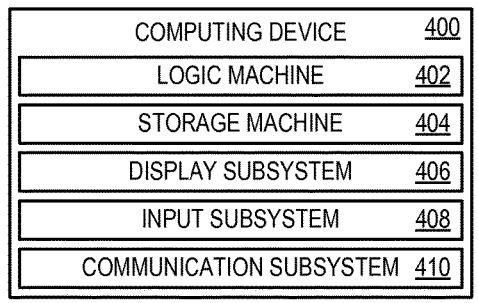
FIG. 4 schematically shows an example computing system according to an embodiment of the present disclosure.

FIG. 4 schematically shows a non-limiting embodiment of a computing system 400 that can enact one or more of the methods and processes described above. Computing system 400 is shown in simplified form. Client 102, remote clients 126 and digital content store 114 are non-limiting examples of computing system 400. Computing system 400 may take the form of one or more game consoles, personal computers, server computers, tablet computers, home-entertainment computers, network computing devices, mobile computing devices, mobile communication devices (e.g., smart phone), and/or other computing devices.

Computing system 400 includes logic machine 402 and storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of acquiring a video game including a plurality of content portions, the method comprising:
receiving and loading into computer memory a first set of the content portions, the first set including less than an entirety of the content portions;
beginning a gameplay session by computer-executing a partial functionality version of the video game using the first set of the content portions before all of the plurality of content portions are received and while other of the plurality of content portions continue to be received;

receiving and loading into computer memory a second set of the content portions while the gameplay session continues and the partial functionality version of the video game continues computer-executing; and adding functionality to the partial functionality version of the video game using the second set of content portions while the gameplay session continues and the partial functionality version of the video game continues computer-executing.

2. The method of claim 1, further comprising:
until sufficient content portions are received and loaded into computer memory for providing a full functionality version of the video game:
progressively receiving and loading into computer memory additional content portions while the gameplay session continues, and
progressively adding functionality to the partial functionality version of the video game using the additional content portions while the gameplay session continues and the partial functionality version of the video game continues computer executing; and
transitioning to the full functionality version of the video game while the gameplay session continues.

3. The method of claim 1, where the first set of the content portions includes a game engine of the video game.

4. The method of claim 1, where the first set of the content portions includes a user-controlled character or entity of the video game.

5. The method of claim 4, where the partial functionality version of the video game comprises the user-controlled character or entity presented in a white room environment prior to receiving additional content portions for presenting a game environment of the full functionality version of the video game.

6. The method of claim 1, where progressively adding functionality includes initially presenting a virtual game element with a partial functionality and subsequently presenting the virtual game element with a full functionality as additional content portions are received.

7. The method of claim 6, where the virtual game element is a 3D virtual game element, and where computer-executing the virtual game element with the partial functionality includes computer-executing a 2D version of the 3D virtual game element.

8. The method of claim 1, where the partial functionality version of the video game includes a partial functionality multiplayer game.

9. The method of claim 8, where the first set of the content portions includes a multiplayer game engine of the video game.

10. The method of claim 1, where the first set of content portions includes a predefined set of content portions.

11. A computing device, comprising:
a logic machine:
a storage machine configured to hold instructions executable by the logic machine to:
computer-execute a video game including a plurality of content portions;
receive and load into the storage machine a first set of the content portions, the first set including less than an entirety of the content portions;
begin a gameplay session by computer-executing, via the logic machine, a partial functionality version of the video game using the first set of content portions before all of the plurality of content portions are received and loaded into the storage machine;
receive and load into the storage machine a second set of the content portions while the gameplay session continues and the partial functionality version of the video game continues to be computer-executed;
add functionality to the partial functionality version of the video game using the second set of content portions while the gameplay session continues and the partial functionality version of the video game continues computer executing.

12. The computing device of claim 11, the instructions being further executable to:
until sufficient content portions are received for providing a full functionality version of the video game:
progressively receive additional content portions while the gameplay session continues, and
progressively add functionality to the partial functionality version of the video game using the additional content portions while the gameplay session continues and the partial functionality version of the video game continues computer executing; and
transitioning to the full functionality version of the video game while the gameplay session continues.

13. The computing device of claim 11, where the partial functionality version of the video game comprises a user-controlled character or entity presented in a white room environment prior to receiving additional content portions for presenting a game environment of the full functionality version of the video game.

14. The computing device of claim 11, where the partial functionality version of the video game includes a full functionality version of a first virtual environment, where progressively adding functionality includes progressively adding functionality to one or more virtual environments other than the first virtual environment.

15. The computing device of claim 14, where progressively adding functionality comprises alerting the user to functionality of the one or more virtual environments other than the first virtual environment, where the instructions are further executable to allow transition from the first virtual environment to another of the one or more virtual environments.

16. A method of acquiring a video game including a plurality of content portions, the method comprising:
downloading via a computer network a first set of the content portions, the first set including less than an entirety of the content portions;
beginning a gameplay session by computer-executing a partial functionality version of the video game using the first set of content portions before all of the plurality of content portions are received and loaded into a storage machine;
until sufficient content portions are received for providing a full functionality version of the video game:
progressively downloading via the computer network additional content portions while the gameplay session continues, and
progressively adding functionality to the partial functionality version of the video game using the additional content portions while the gameplay session continues; and
transitioning to the full functionality version of the video game while the gameplay session continues.

17. The method of claim 16, where the partial functionality version of the video game comprises a user-controlled character or entity presented in a white room environment prior to receiving the additional content portions for presenting a game environment of the full functionality version of the video game.

18. The method of claim 16, where progressively adding functionality includes dynamically recognizing one or more virtual game elements at least partially described by the additional content portions based on a comparison with predefined byte range information, where each virtual game element not fully described by the additional content portions is presented with a partial functionality, and where each virtual element fully described by the additional content portions is presented with a full functionality.

* * * * *